United States Patent [19]

Needham

[11] 4,115,283

[45] Sep. 19, 1978

[54] ANTIFRICTION COMPOSITION

[75] Inventor: Donald G. Needham, Bartlesville, Okla.

[73] Assignee: Phillips Petroleum Company, Bartlesville, Okla.

[21] Appl. No.: 861,078

[22] Filed: Dec. 15, 1977

Related U.S. Application Data

[63] Continuation of Ser. No. 640,089, Dec. 12, 1975, abandoned.

[51] Int. Cl.$^2$ .................... C10M 5/00; C10M 7/00; F16C 00/00; F16D 69/00
[52] U.S. Cl. ...................... 252/12.4; 252/12
[58] Field of Search ................. 252/12.4, 12

[56] References Cited

U.S. PATENT DOCUMENTS

| 3,354,129 | 11/1967 | Edmonds et al. | 260/79 |
| 3,882,030 | 5/1975 | Campbell et al. | 252/12.4 |

OTHER PUBLICATIONS

"Modern Plastics", vol. 42, No. 1A, Sep. 1964, McGraw ∝ Hill, N.Y., N.Y., pp. 529–536.

*Primary Examiner*—Irving Vaughn

[57] ABSTRACT

Antifriction compositions useful for bearings comprising poly(arylene sulfide), a solid lubricating component, a reinforcing material, and a filler in which the commonly employed antimony trioxide filler is replaced in whole or in part by a replacement filler of calcium carbonate, titanium dioxide, barium sulfate, hydrated aluminum silicates, red iron oxide, carbon black or diatomaceous earth, compatible with the other components.

49 Claims, No Drawings

ANTIFRICTION COMPOSITION

This application is a Continuation of Ser. No. 640,089, filed Dec. 12, 1975 and now abandoned, in part allowed.

FIELD OF THE INVENTION

The invention relates to self-lubricating antifriction compositions.

BACKGROUND OF THE INVENTION

Poly(arylene sulfide), such as poly(phenylene sulfide), is a useful and respected matrix material for antifriction compositions such as self-lubricating bearings. These compositions commonly have employed components comprising poly(arylene sulfide), a solid lubricating component, a reinforcing material, and a modest but expensive amount of antimony oxide as a filler.

Antimony trioxide has been a filler of choice because of its compatibility with the other components, availability, and moderate cost. Unfortunately, antimony trioxide no longer is so readily available, and its cost has been increasing rapidly, making it now a major cost factor in formulation of such bearings. Needed are materials capable of replacing the antimony trioxide in whole or in part, yet holding the cost line, while maintaining the highly desirable properties such as tensile strength of the polymer of the composition, and yet providing adequate bearing wear test results, low wear, low coefficient of friction.

BRIEF SUMMARY OF THE INVENTION

I have discovered that certain fillers can replace in whole or in part the heretofore-thought-necessary antimony trioxide, and still provide a poly(arylene sulfide)-based antifriction bearing composition of desirable tensile strength, low wear results, and low coefficient of friction.

The compositions of my invention employ components comprising (a) poly(arylene sulfide), (b) one or more solid lubricating components, (c) one or more reinforcing materials, and (d) the filler which in accordance with my invention is calcium carbonate, titanium dioxide, barium sulfate, hydrated aluminum silicates, carbon black, red iron oxide, or diatomaceous earth, any of these alone, or in combination, or in combination with antimony trioxide. These fillers that I have listed are effective replacements in whole or in part for the heretofore commonly employed antimony trioxide. These compositions are particularly useful for the preparation of bearing compositions by injection molding.

DETAILED DESCRIPTION OF THE INVENTION

The compositions which I have discovered as making very satisfactory self-lubricating bearings comprise (a) poly(arylene sulfide) in the range of about 30 to 50 weight percent, (b) at least one solid lubricating component in the range of about 15 to about 25 weight percent, (c) at least one reinforcing material in the range of about 15 to 25 weight percent, and selected from the group consisting of glass fibers, asbestos fibers, carbon fibers, boron fibers, or ceramic fibers, alone or in admixture, and (d) a filler in the range of about 10 to 20 weight percent, selected from the group consisting of calcium carbonate, titanium dioxide, barium sulfate, hydrated aluminum silicates, carbon black, red iron oxide, or diatomaceous earth, any of these alone, or in any combination, or in combination with antimony trioxide.

The poly(arylene sulfide) polymers useful in the preparation of anti-friction self-lubricating bearing compositions can be prepared by any of the methods known to the art. Particularly suitable are methods such as set forth in U.S. Pat. No. 3,354,129 to James T. Edmonds, Jr., and Harold Wayne Hill, Jr. According to this method, at least one polyhalo-substituted aryl compound wherein the halogen atoms are attached to ring carbon atoms is reacted with an alkali metal sulfide in a polar organic compound at an elevated temperature.

For use in bearing compositions, the poly(arylene sulfide) polymers prior to heat treatment preferably have an inherent viscosity of at least about 0.01, more preferably at least about 0.1 to 0.25, as measured in 1-chloronaphthalene at 206° C. at a polymer concentration of 0.4 gram per one hundred milliliters of solvent; a melt flow in excess of 2700 g/10 minutes under a 5 kg load at 315° C. (ASTM D1238-70); and a polymer density of about 1.1 to 1.8 g/cc.

The poly(arylene sulfide) polymers are heat treated in air or other molecular oxygen containing gas at a temperature of about 450° to 650° F. for a sufficient time such as about 1 to 24 hours, to reduce the melt flow and increase the tensile strength of the ultimate molded product. The heat-treated polymer preferably will exhibit a melt flow (ASTM D1238-70, at 315° C., 5 kg weight) of about 25 to 100 g/10 min. Without heat treatment of the polymer, molded articles may tend to crack.

The solid lubricating components can be selected from any of those generally known and used in the art for the purpose, such as molybdenum disulfide, graphite, molybdenum diselenide, tungsten diselenide, tungsten disulfide, or any of the polytetrafluoroethylenes, along or in combination; presently preferably selected from molybdenum disilfide, graphite, and polytetrafluoroethylene; sufficient to comprise about 15 to 25 weight percent of the total composite. Each of these is available in grades suitable for employment as a lubricant, such as substantially oil-free, and should be a finely divided powdered grade.

The graphite employed can be either natural or synthetic in origin. The polytetrafluoroethylenes are commonly known as "Teflon" and include homopolymers of tetrafluoroethylene such as polytetrafluoroethylene, as well as copolymers of tetrafluoroethylene with such as hexafluoropropylene.

The third component comprising my compositions is a reinforcing material, one or more, employed in a total amount representing about 15 to 25 weight percent of my bearing compositions. These reinforcing materials can be glass fibers, asbestos fibers, carbon fibers, boron fibers, ceramic fibers, any of these alone, or in combination. Fiber length can vary widely, but presently preferably should be of the order of such as about 1 to 4 mm long after blending. Glass fibers are presently preferred for matters of cost and ease of handling, since glass fibers can be incorporated as a roving and, in effect, chopped in the blending procedures.

The fillers employed in the range of about 10 to 20 weight percent in the compositions in accordance with my invention can include antimony trioxide, the filler of choice heretofore, though its cost is becoming higher. However, the antimony trioxide can be and preferably is replaced in whole by my additives, or in part by at least a portion of the additives, in accordance with my discovery, which additives can be one or more of calcium carbonate, titanium dioxide, barium sulfate, hydrated aluminum silicates, carbon black, red iron oxide, or diatomaceous earth, alone, or in any combination, or in combination with antimony trioxide. For economic reasons, the less antimony trioxide employed, the more economical the resulting blend with one or more of the other components in supplying the balance. Thus, the antimony trioxide can be any amount less than about 20 weight percent of the compositions down to 0, with one or more of the fillers of my discovery making up the balance. The additives can be used to completely replace the antimony trioxide, or to replace it in part, or substantially replace the antimony trioxide, such as up to 90 weight percent replacement relative to amount of filler (18 weight percent based on weight of composition), preferably where admixture with antimony trioxide is used, about 40–60 percent replacement, depending on cost of the antimony trioxide. It is most preferred to replace the high-cost antimony trioxide completely with a cheaper but effective filler.

The materials used to replace the antimony trioxide, in whole or in part, should be in a finely divided or powdered form, such as a particle size of about 200 mesh or less.

Calcium carbonate is available as both synthetic and naturally occurring materials, and under various names such as powdered limestone, marble, chalk, "whites", "whitings", precipitated chalk, and the like.

Titanium dioxide is available under a variety of terms, titania, titanium white, and can be used as either the white or black, so long as in fine powdered form.

Powdered barium sulfate is available under various names, such as barium sulfate precipitated, heavy spar, barite or barytes, permanent white, and the like.

The term hydrated aluminum silicates represents a variety of natural and synthetic materials of varying proportions of $Al_2O_3$ and $SiO_2$. A presently particularly useful and available type is pyrophyllite, a naturally occurring hydrous aluminum silicate of varying color such as white—offwhite—to tan. Various of the clays also are suitable as hydrated aluminum silicates, such as kaolinite, halloysite, and the presently preferred bentonite, and clays containing these components.

Carbon blacks suitable in the compositions of my invention include any of those made by the incomplete combustion or thermal decomposition of various carbon sources, such as natural gas and petroleum oils. The principal types include the channel blacks, furnace blacks, and thermal blacks. Presently preferred for their availability are the finely powdered thermal and furnace blacks of ASTM designation N-1 through N-9, and presently more preferred are the medium thermal blacks such as ASTM N-9. The graphites, while useful in the combinations as lubricants, are unsuited for usage as fillers.

The iron oxides suitable for use in bearing compositions are the red ferric iron oxides or $Fe_2O_3$, natural or synthetic. These are available under various tradenames. The "red" designation indicates the substantially ferric and anhydrous character desired.

Diatomaceous earth is a naturally occurring high silica material, available as diatomite, kieselguhr, and the like.

Other materials may be used in such compositions as I have described, such as powdered metals, so long as they do not adversely affect the properties of my compositions.

In preparing my lubricating compositions, weighed quantities of each of the selected ingredients are blended or mixed thoroughly. The blending can be accomplished in any suitable manner using conventional blending apparatus. The polymer, lubricating components, reinforcing materials, and fillers, preferably should be in particulate form, though the poly(arylene sulfide) polymers frequently are supplied and are suitably used in small pellet form. The poly(arylene sulfide) polymers are commercially available containing an admixed proportion of glass fibers, such as 20 to 60 weight percent, and where glass fibers are to be the reinforcing agent of choice, such poly(arylene sulfide) polymer/glass fiber admixtures are a convenience.

If desired, an inert diluent can be employed in mixing of the ingredients, since such diluent can be easily removed from the admixture subsequently in order not to interfere with later processing steps, such as by heat treatment. Suitable diluents are typically the halogenated hydrocarbons.

The mixed admixture then is utilized in the preparation of bearings of suitable type and size. The bearings can be made by injection molding at elevated temperatures, such as in the range of about 600° to 750° F. stock temperature, preferably 600° to 650° F., using a mold temperature of such as about 100° to 200° F.

Alternatively, the admixed composition can be ground to a suitable powder in the range of about 75 to 300 mesh, and compressed in a mold at ambient temperature under elevated compression pressures such as in the range of about 500 to 5,000 psig. It is also suitable to admix the poly(arylene sulfide) polymer, the solid lubricating component, the filler, prepare an admixture, and then at the compression stage incorporate glass fibers into the molding operation. The compression molding process is also well known in the art and can be readily carried out by persons skilled in this method. The compression admixture can be heated at compression pressure such as to temperatures of such as about 600° to 750° F. for a time of such as about ½ to 2 hours so as to produce the desired configuration.

The mold composite is allowed to cool slowly, such as to a temperature of about 150° to 200° F. or lower, after which the molded article can be removed from the mold and employed, or subjected to such trimming and machining as may be necessary to complete the desired configuration.

The self-lubricating compositions, in accordance with my invention are useful in a variety of applications such as journal bearings, bushings, ball bearing cages, compressor pistons, a variety of fittings, washers, seals, seats, wear rings, and the like.

EXAMPLES

The examples following are designed to assist in an understanding of my invention, without limiting the scope thereof. Examples are to be considered as a part of my overall disclosure including claims. Particular components, amounts, conditions, are designed to assist in an understanding of the invention, and thus are exemplary, and not limitative.

EXAMPLE I

The poly(arylene sulfide) polymer employed in the examples was a poly(phenylene sulfide) prepared by reacting p-dichlorobenzene with a mixture in which sodium sulfide was contacted with N-methylpyrrolidone.

The poly(arylene sulfide) polymer employed was prepared by charging lithium acetate and N-methylpyrrolidone to the reactor followed by dehydrating to strip any water. Sodium sulfide was produced in situ by adding equivalent quantities of NaHS and NaOH in water, using a slight excess of 0.1 mole NaOH, followed by dehydration to remove the water. p-Dichlorobenzene was added in equivalent quantity to the moles of $Na_2S$ formed. The reaction mixture was heated 3 hours at about 400° F., and then for additional 3 hours at about 510° F. The reaction mass was concentrated by boiling off about half of the liquid in the reactor means. Excess $CO_2$ gas was then added to neutralize the mixture. The mixture then was heated to about 540° F., and flashed to recover the dry poly(phenylene sulfide) polymer. The polymer was cooled, ground, washed with water and dried and recovered.

The original melt flow was above 2700, the limit of the instrument. The poly(phenylene sulfide) so prepared was heated in air at about 500° F. for about 6 hours to reduce the original melt flow. The final poly(phenylene sulfide) had a density of 1.6 g/cc (ASTM D-1505-68), and a melt flow of 50 g/10 minutes (ASTM D-1238-70, 315.5° C./10 kg weight). This polymer is commercially available as Ryton® R-6 from Phillips Petroleum Company as a pelleted material.

The glass-filled poly(phenylene sulfide) employed in the following examples was made by blending the above polymer with glass fiber strands (roving) to make the final blend containing about 40 weight percent glass fibers 1 to 4 mm long after blending, and repelletizing the blend. This glass-filled blend is commercially available under the deisgnation Ryton® R-4. This material including the glass fiber exhibited a density of about 1.6 g/cc, and a melt flow of about 25 g/10 minutes measured under the conditions as described above.

All bearing samples, the composition of which is given below, were blended in a Henschel intensive mixer for about 3 minutes, extruded, and pelletized. Test bearings were made by injection molding the blended pellets at about 600° to 625° F. stock temperature and 150° F. mold temperature, to prepare flat sections ¼ by ½ by ⅜ inch in size.

These test sections were tested for antifriction properties using an LFW-1 Lewis Fiction Wear Test machine. Details of the LFW-1 machine are covered in the publication NASA-SP-5059 of May, 1966, pages 57–59. The LFW-1 machine is employed using a single test block. At least two runs are made per sample blend for Wear and Coefficient of Friction, and the results averaged for the "Run" reported in the following Tables II and III; and single runs for Table I. Each sample is "run in" or seated at a 15 lb. load at increasing speeds, 40 rpm for 2 minutes, 100 rpm for 2 minutes, and 190 rpm for 2 minutes, followed immediately by the severe determinative run under a 90 lb. load at 190 rpm for 10 minutes. Three determinations are made for the wear test, and coefficients of friction, and the values averaged.

The various prepared samples for testing each represented a final composition of:

| | |
|---|---|
| Poly(phenylene sulfide) | 43 weight percent |
| Glass fibers | 20 weight percent |
| Molybdenum disulfide | 20 weight percent |
| Filler | 17 weight percent |

Within each group of tests as reported in the respective tables, a control with $Sb_2O_3$ alone was run to give a comparative baseline for that group of runs. The respective wear test results and coefficients of friction represent average obtained on two samples. It is considered that the coefficient of friction should be less than about 0.35. Particularly important for frictionless bearings is the wear test under the 90 lb. load, which is considered to be a severe test. The wear test results should not be much over about $2 \times 10^{-3}$, with any significantly greater values of $3 \times 10^{-3}$ to $4 \times 10^{-3}$ and higher generally showing unacceptable wear levels. Thus, what is desired is a low coefficient of friction coupled with low wear for minimum friction and long life.

TABLE I

Properties of PPS Antifriction Bearing Compositions

| Run | Filler | Tensile Strength, psi | Elongation, % | Shore Hardness | Density g/cc | Bearing West Test Wear Inches | Coefficient of Friction |
|---|---|---|---|---|---|---|---|
| 1 | $Sb_2O_3$ | 13,300 | 0.97 | 87 | 1.70 | $2.0 \times 10^{-3}$ | 0.20 |
| 2 | $CaCO_3$ | 13,100 | 0.89 | 88 | 1.95 | 2.0 | 0.17 |
| 3 | $TiO_2$ | 12,000 | 0.86 | 87 | 2.00 | 2.2 | 0.22 |
| 4 | $BaSO_4$ | 12,700 | 0.96 | 87 | 2.08 | 2.0 | 0.23 |
| 5 | $Na_2CO_3$ | 11,400 | 0.85 | 87 | 1.92 | 11.2 | 0.32 |
| 6 | Talc | 11,600 | 0.79 | 85 | 1.94 | 4.8 | 0.18 |
| 7 | ZnO | 12,800 | 0.92 | 87 | 2.04 | 8.0 | 0.17 |
| 8 | $ZrSiO_4$ | 12,200 | 0.84 | 87 | 1.96 | 3.0 | 0.26 |

TABLE II

| Run | Filler wt. % $Sb_2O_3$ | $CaCO_3$ | $TiO_2$ | $BaSO_4$ | Tensile Strength, psi | Elongation, % | Shore Hardness | Density | Bearing Wear Test Wear Inches | Coefficient of Friction |
|---|---|---|---|---|---|---|---|---|---|---|
| 9 | 17 | — | — | — | 14,300 | 0.86 | 88 | 2.13 | $1.5 \times 10^{-3}$ | 0.17 |
| 10 | — | — | 8.5 | 8.5 | 13,500 | 0.88 | 88 | 2.08 | 1.2 | 0.205 |
| 11 | — | 8.5 | 8.5 | — | 13,100 | 0.80 | 87 | 2.04 | 1.9 | 0.195 |
| 12 | — | 8.5 | — | 8.5 | 13,800 | 0.86 | 88 | 2.05 | 0.8 | 0.18 |
| 13 | 8.5 | 8.5 | — | — | 13,800 | 0.82 | 89 | 2.05 | 0.9 | 0.185 |
| 14 | — | 17 | — | — | 13,400 | 0.85 | 87 | 1.95 | 1.6 | 0.17 |
| 15 | — | — | 17 | — | 13,200 | 0.79 | 89 | 2.09 | 1.4 | 0.24 |
| 16 | — | — | — | 17 | 14,300 | 0.94 | 88 | 2.07 | 2.1 | 0.25 |

TABLE III

| Run | Filler | Wt. % | Tensile Strength, psi | Elongation % | Density | Shore Hardness | Bearing Wear Test Wear Inches | Coefficient of Friction |
|---|---|---|---|---|---|---|---|---|
| 17 | $Sb_2O_3$ | 17 | 14,100 | 0.87 | 2.14 | 87 | $0.4 \times 10^{-3}$ | 0.18 |
| 18 | Pyrophyllite[1] | 17 | 13,200 | 0.77 | 2.17 | 90 | 1.3 | 0.205 |
| 19 | Carbon Black[2] | 17 | 11,800 | 0.68 | 1.93 | 89 | 1.2 | 0.22 |
| 20 | Red Iron Oxide | 17 | 12,600 | 0.74 | 1.94 | 90 | 1.2 | 0.205 |
| 21 | Bentonite | 17 | 12,300 | 0.90 | 1.91 | 89 | 1.75 | 0.26 |
| 22 | Diatomaceous Earth[3] | 17 | 10,300 | 0.67 | 1.98 | 90 | 1.6 | 0.25 |

[1] Parway WA, a commercial hydrated aluminum silicate.
[2] Thermax 991, Vanderbilt Co., a commercial medium thermal carbon ASTM N-991.
[3] Super-Floss, Johns-Manville.

In Table I, control Run 1 employed only antimony trioxide as filler. Runs 2, 3, 4, of the invention, employed calcium carbonate, titanium dioxide, and barium sulfate, respectively, each as a complete replacement for antimony trioxide at the same level as employed in control Run 1. Each of these fillers exhibited a coefficient of friction very close to that of the antimony trioxide, and even lower in the case of calcium carbonate Run 2. In each of Runs 2, 3, and 4, the bearing wear test was satisfactorily low, virtually equivalent to the antimony trioxide Run 1 results. These good results were surprising since another carbonate, sodium carbonate Run 5, was very poor; another oxide, zinc oxide Run 7, was very poor.

Run 5 employing the readily available carbonate, sodium carbonate, Run 6 using talc, Run 7 using zinc oxide, and Run 8 using zirconium silicate, at the same replacement level, failed, showing excessively high wear values and high coefficients of friction.

In another set of runs shown in Table II, another control Run 9 was made employing antimony trioxide. In Runs of the invention 10, 11, and 12 replacing the antimony trioxide completely, and Run 13 replacing half of the antimony trioxide, the coefficient of friction was close to that of control Run 9, and the bearing wear in inches was generally improved, only slightly higher in the case of the calcium carbonate/titanium dioxide admixture Run 11, and not significantly so. In Run 14 using calcium carbonate, Run 15 using titanium dioxide, and Run 16 using barium sulfate, each as a complete replacement for antimony trioxide, satisfactory wear test and coefficient of friction values were obtained.

In a third series of runs as shown on Table III, again a control Run 17 was made with antimony trioxide. It is readily apparent that results in Run 18 with hydrated aluminum silicate, Run 19 with carbon black, Run 20 with red iron oxide, Run 21 with bentonite, Run 22 with diatomaceous earth, each exhibited a satisfactory coefficient of friction and low desirable wear test results. Run 22 with diatomaceous earth exhibited a slight decrease in tensile strength of the polymer.

Results from the tests with pyrophyllite Run 18, bentonite Run 21, and diatomaceous earth Run 22, are particularly surprising in view of the poor results from other silicates such as talc Run 6, and zirconium silicate Run 8.

The results of the three sets of runs, each set of runs including a direct comparative run with antimony trioxide tested at the same time and under the same conditions, show that calcium carbonate, or titanium dioxide, or barium sulfate, or hydrated aluminum silicate, or carbon black, or red iron oxide, or diatomaceous earth, or any combination of these, can be used to replace all or a part of the antimony trioxide.

The disclosure, including data, illustrates the value and effectiveness of my invention. The examples, the knowledge and background of the field of the invention and general principles of chemistry and other applicable sciences, have formed the bases from which the broad descriptions of the invention including the ranges of conditions and the generic groups of operant components have been developed, which have formed the bases for my claims here appended.

I claim:

1. A self-lubricating composition comprising (a) heat-treated poly(arylene sulfide) in the range of about 30 to 50 weight percent, (b) at least one solid lubricating component in the range of about 15 to 25 weight percent, (c) at least one reinforcing material in the range of about 15 to 25 weight percent, and (d) at least one filler in the range of about 10 to 20 weight percent, based on the total weight of said composition,
   wherein said (b) solid lubricating component is molybdenum disulfide, molybdenum diselenide, tungsten disulfide, tungsten diselenide, graphite, polytetrafluoroethylene, or mixture,
   wherein said (c) reinforcing material is glass fibers, asbestos fibers, carbon fibers, boron fibers, ceramic fibers, or mixture,
   wherein said (d) filler is calcium carbonate, titanium dioxide, barium sulfate, hydrated aluminum silicates, carbon black, red iron oxides, diatomaceous earth, admixtures thereof, or admixtures with antimony trioxide.

2. The composition according to claim 1 wherein said (a) heat-treated poly(arylene sulfide) is a poly(phenylene sulfide) characterized by a M.F. of about 25 to 1,000.

3. The composition according to claim 2 wherein said (c) reinforcing material has a fiber length of about 1 to 4 mm.

4. The composition according to claim 2 wherein said (a) poly(phenylene sulfide) is a heat-treated poly(phenylene sulfide) characterized, prior to being heat-treated, by a density in the range of about 1.1 to 1.8, a melt flow in excess of 2700, and an I.V. of 0.1 to 0.25.

5. The composition according to claim 4 wherein said (a) heat-treated poly(phenylene sulfide) is prepared by reacting p-dichlorobenzene with a mixture in which sodium sulfide is contacted with N-methylpyrrolidone, and the resulting polymer is heat-treated by heating in air at a temperature of about 450° to 550° F.

6. The composition according to claim 2 wherein said (b) solid lubricating component is said molybdeum disulfide, and said (c) reinforcing material is said glass fiber.

7. The composition according to claim 6 wherein said (d) filler is said calcium carbonate.

8. The composition according to claim 7 employing said calcium carbonate to the extent of about 17 weight percent, and said composition contains about 20 weight percent said glass fiber, about 20 weight percent said molybdenum disulfide, and about 43 weight percent said poly(phenylene sulfide).

9. The composition according to claim 6 wherein said (d) filler is said titanium dioxide.

10. The composition according to claim 9 employing said titanium dioxide to the extent of about 17 weight percent, and said composition contains about 20 weight percent said glass fiber, about 20 weight percent said molybdenum disulfide, and about 43 weight percent said poly(phenylene sulfide).

11. The composition according to claim 6 wherein said (d) filler is said barium sulfate.

12. The composition according to claim 11 employing said barium sulfate to the extent of about 17 weight percent, and said composition contains about 20 weight percent said glass fiber, about 20 weight percent said molybdenum disulfide, and about 43 weight percent said poly(phenylene sulfide).

13. The composition according to claim 6 wherein said (d) filler is said titanium dioxie and said barium sulfate.

14. The composition according to claim 13 employing said titanium dioxide to the extent of about 8.5 weight percent and 8.5 percent barium sulfate, and said composition contains about 20 weight percent said glass fiber, about 20 weight percent said molybdenum disulfide, and about 43 weight percent said poly(phenylene sulfide).

15. The composition according to claim 6 wherein said (d) filler is said titanium dioxide and calcium carbonate.

16. The composition according to claim 15 employing said titanium dioxide to the extent of about 8.5 percent, said calcium carbonate to the extent of about 8.5 weight percent, and wherein said composition contains about 20 weight percent of said glass fiber, about 20 weight percent said molybdenum disulfide, and about 43 weight percent said poly(phenylene sulfide).

17. The composition according to claim 6 wherein said (d) filler is said calcium carbonate and barium sulfate.

18. The composition according to claim 17 employing said calcium carbonate to the extent of about 8.5 percent, said barium sulfate to the extent of about 8.5 weight percent, about 20 weight percent said glass fiber, about 20 weight percent said molybdenum disulfide, and about 43 weight percent said poly(phenylene sulfide).

19. The composition according to claim 6 wherein said (d) filler is said antimony trioxide with at least one other named filler and employing said antimony trioxide up to about 18 weight percent based on the weight of said composition.

20. The composition according to claim 19 wherein said (d) filler is said antimony trioxide and calcium carbonate.

21. The composition according to claim 20 employing said antimony trioxide to the extent of about 8.5 weight percent and said calcium carbonate to the extent of about 8.5 weight percent, and wherein said composition contains about 20 weight percent said glass fiber, about 20 weight percent said molybdenum disulfide, about 43 weight percent said poly(phenylene sulfide).

22. The composition according to claim 6 wherein said (d) filler is a hydrated aluminum silicate.

23. The composition according to claim 22 wherein said hydrated aluminum silicate is a pyrophyllite or bentonite.

24. The composition according to claim 22 wherein said filler employs said hydrated aluminum silicate to the extent of about 17 weight percent, and wherein said composition contains about 20 weight percent said glass fiber, about 20 weight percent said molybdenum disulfide, and about 43 weight percent said poly(phenylene sulfide).

25. The composition according to claim 6 wherein said (d) filler is said carbon black.

26. The composition according to claim 25 wherein said filler employs said carbon black to the extent of about 17 weight percent, and wherein said composition contains about 20 weight percent said glass fiber, about 20 weight percent said molybdenum disulfide, and about 43 weight percent said poly(phenylene sulfide).

27. The composition according to claim 6 wherein said (d) filler is diatomaceous earth.

28. The composition according to claim 27 employing said diatomaceous earth to the extent of about 17 weight percent, and wherein said composition contains about 20 weight percent said glass fiber, about 20 weight percent said molybdenum disulfide, and about 43 weight percent said poly(phenylene sulfide).

29. The self-lubricating composition comprising (a) heat-treated poly(phenylene sulfide) characterized by a M.F. of about $$\frac{25 \text{ to } 1{,}000 \text{ grams}}{10 \text{ min.}}$$

as per ASTM D-1238-20 at 315.5° C./10 kg weight, in the range of about 30 to 50 weight percent, (b) molybdenum disulfide in the range of about 15 to 25 weight percent, (c) glass fibers in the range of about 15 to 25 weight percent, and (d) red iron oxide in the range of about 10 to 20 weight percent, said weight percent based on the total weight of said composition.

30. The composition according to claim 29 employing said red iron oxide to the extent of about 17 weight percent, and wherein said composition contains about 20 weight percent said glass fiber, about 20 weight percent said molybdenum disulfide, and about 43 weight percent said poly(phenylene sulfide).

31. A self-lubricating composition exhibiting low wear and low coefficient of friction values consisting essentially of
  (a) heat-treated poly(arylene sulfide) in the range of about 30 to 50 weight percent,
  (b) at least one solid lubricating component in the range of about 15 to 25 weight percent and selected from the group consisting of molybdenum disulfide, graphite, molybdenum diselenide, tungsten diselenide, tungsten disulfide, polytetrafluoroethylene, or mixture.
  (c) at least one reinforcing material in the range of about 15 to 25 weight percent and selected from the group consisting of glass fibers, asbestos fibers, carbon fibers, boron fibers, ceramic fibers, or mixtures, and
  (d) at least one filler in the range of about 10 to 20 weight percent, all percentages based on the total weight of said composition, wherein said (d) filler is selected from the group consisting of calcium carbonate, titanium dioxide, barium sulfate, hydrated alumino-silicates, carbon black, red iron oxides, diatomaceous earth, admixtures thereof, and admixtures of any of these with antimony trioxide, such that wherein said filler contains said antimony trioxide, said antimony trioxide represents up to 90 weight percent of said filler.

32. A self-lubricating composition prepared by the steps which comprise admixing
   (a) heat-treated poly(arylene sulfide) in the range of about 30 to 50 weight percent,
   (b) at least one solid lubricating component in the range of about 15 to 25 weight percent, which is molybdenum disulfide, molybdenum diselenide, tungsten disulfide, tungsten diselenide, graphite, polytetrafluoroethylene, or mixture,
   (c) at least one reinforcing material in the range of about 15 to 25 weight percent, which is glass fibers, asbestos fibers, carbon fibers, boron fibers, ceramic fibers, or mixture, and
   (d) at least one filler in the range of about 10 to 20 weight percent, each said weight percent based on the total weight of said composition, wherein said (d) filler is titanium dioxide, barium sulfate, calcium carbonate, carbon black, hydrated alumino-silicates, red iron oxide, diatomaceous earth, admixtures thereof, or admixtures with antimony trioxide, and
   molding said admixture under molding conditions at elevated temperatures.

33. The composition according to claim 32 wherein said molding is injection molding employing a stock temperature in the range of about 600° to 650° F.

34. The composition according to claim 32 wherein said molding is compression molding and further employs elevated pressures of about 500 to 5,000 psig.

35. The composition according to claim 32 wherein said heat-treated poly(arylene sulfide) is a heat-treated poly(phenylene sulfide) characterized by a M.F. of about 25 to 100.

36. The composition according to claim 35 wherein said (b) solid lubricating component is said molybedenum disulfide, and said (c) reinforcing material is said glass fiber.

37. The composition according to claim 36 wherein said (d) filler is said calcium carbonate.

38. The composition according to claim 36 wherein said (d) filler is said titanium dioxide.

39. The composition according to claim 36 wherein said (d) filler is said barium sulfate.

40. The composition according to claim 36 wherein said (d) filler is said barium sulfate and titanium dioxide.

41. The composition according to claim 36 wherein said (d) filler is said calcium carbonate and titanium dioxide.

42. The composition according to claim 36 wherein said (d) filler is said calcium carbonate and barium sulfate.

43. The composition according to claim 36 wherein said (d) filler is said calcium and antimony trioxide.

44. The composition according to claim 36 wherein said (d) filler is said hydrated aluminum silicate.

45. The composition according to claim 44 wherein said hydrated aluminum silicate is a pyrophyllite or bentonite.

46. The composition according to claim 36 wherein said (d) filler is said carbon black.

47. The composition according to claim 36 wherein said (d) filler is said diatomaceous earth.

48. The composition according to claim 32 wherein said (a) heat-treated poly(phenylene sulfide) is prepared by reacting p-dichloro-benzene with a mixture in which sodium sulfide is contacted with N-methyl-pyrrolidone, and the resulting polymer is characterized by a melt flow in excess of 2700, and is pretreated by heating in air at a temperature of about 450° to 550° F.

49. The self-lubricating composition prepared by the steps which comprise admixing (a) heat-treated poly(arylene sulfide) characterized by M.F. of about 25 to 100 in the range of 30 to 50 weight percent, (b) molybdenum disulfide in the range of about 15 to 25 weight percent, (c) glass fibers in the range of about 15 to 25 weight percent, and (d) red iron oxide in the range of about 10 to 20 weight percent, and molding the resulting admixture under molding conditions at elevated temperatures.

* * * * *